J. H. BAKER.
MANUFACTURING STAY BOLTS.
APPLICATION FILED FEB. 10, 1911.
1,022,998.
Patented Apr. 9, 1912.
FIG. 1.
FIG. 2.
FIG. 3.
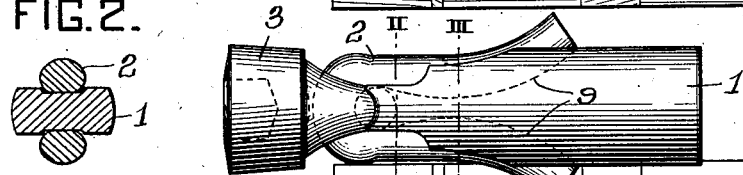
FIG. 4.
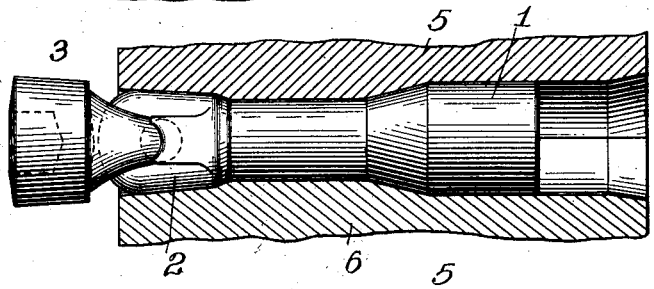
FIG. 5.
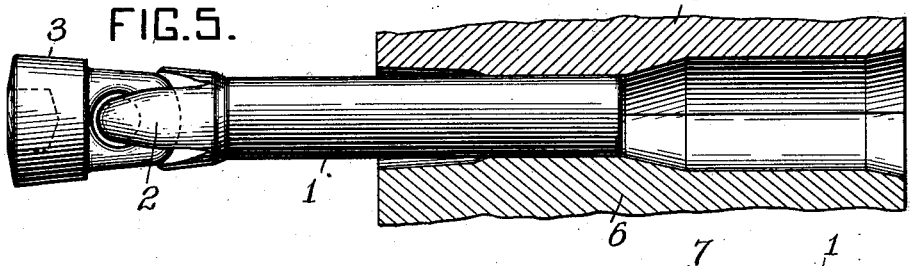
FIG. 6.
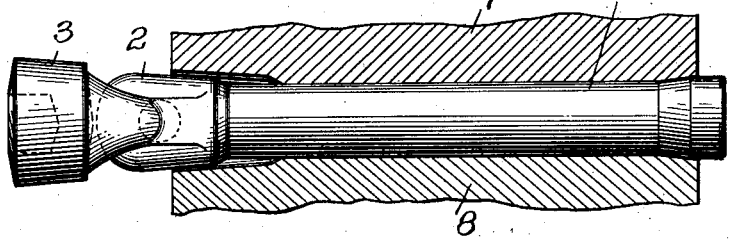
FIG. 7.
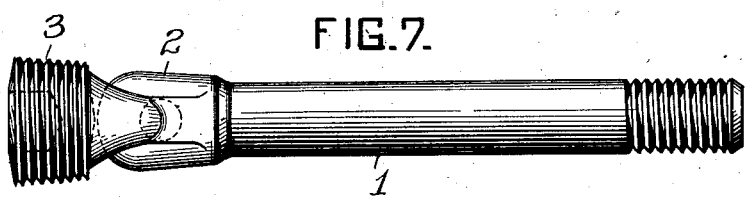
WITNESSES:
J. Herbert Bradley
Francis J. Tomasson
INVENTOR
James H. Baker
by Christy and Christy
Atty's
COLUMBIA PLANOGRAPH CO., WASHINGTON, D. C.

UNITED STATES PATENT OFFICE.

JAMES H. BAKER, OF PITTSBURGH, PENNSYLVANIA, ASSIGNOR TO FLEXIBLE BOLT COMPANY, OF PITTSBURGH, PENNSYLVANIA, A CORPORATION OF DELAWARE.

MANUFACTURING STAY-BOLTS.

1,022,998.      Specification of Letters Patent.      Patented Apr. 9, 1912.

Application filed February 10, 1911. Serial No. 607,800.

*To all whom it may concern:*

Be it known that I, JAMES H. BAKER, residing at Pittsburgh, in the county of Allegheny and State of Pennsylvania, a citizen of the United States, have invented or discovered certain new and useful Improvements in the Art of Manufacturing Stay-Bolts, of which improvements the following is a specification.

My invention relates to improvements in the art of manufacturing stay-bolts, for uniting boiler plates and for like uses, of the nature shown and described in Letters Patent Nos. 792,863; 823,825; and 971,805, to George S. Thompson. The distinctive character of these bolts is that they consist of head and shank members, interlinked with one another. In the manufacture of bolts of this nature, as it has heretofore been practiced, great care and attention must be given to obtain a perfect weld of the parts which go to make up the shank member, particularly at or near the inner end, that is the end which interlinks with the head member. The said shank member is formed from two pieces of metal which in the specifications of the patents above referred to are called the "strap" and the "filler." The strap consists ordinarily of a rod of malleable wrought iron of suitable dimensions and round in cross section; the filler is an elongate block of similar metal of suitable size, preferably grooved to receive the strap ends; and, in the manufacture as heretofore practiced, this filler has been of uniform thickness from end to end. In manufacture, the strap is looped through the eye or link of the head member, and its free ends are then brought to position, engaging opposite surfaces of the filler, which surfaces (as above noted) are preferably grooved to receive them. When the pieces of metal from which the shank member of the bolt is formed are thus assembled, they are brought to welding temperature, and then subjected to a welding and swaging operation, in which operation the component pieces of metal are worked into one, and the united structure brought to desired size.

After the parts of the shank member have been assembled, as above described, and when it is desired to bring the article to welding temperature preparatory to further working, each individual bolt is grasped by a pair of tongs; and, while so grasped, is introduced into and sustained within a heating furnace. In the ensuing heating operation, as it has heretofore been practiced, care and attention have been required, particularly in the matter of localization of heat; for, other things being equal, the tongs-held end of the blank (and this is the inner or linked end) will be retarded in heating because of conduction of heat at that end of the relatively cold tongs; and, in consequence, the free or outer end of the blank will come first to welding temperature; and, when welding temperature has been reached, it may not without detriment be exceeded, but the welding operation must follow. Consequently, without the attention and care to which I have alluded, given to each individual bolt, there is danger of imperfect welding at or near the inner or link end of the shank member, the point in the structure where intimate and enduring union is in the service of the bolt desired.

From what has been said, it is manifest that a certain degree of careful manipulation has in the prior manufacture been necessary; the elimination of which, together with a maintenance of excellent quality in product, is the object of my present invention. This object I accomplish by a method of operation which I shall now particularly describe.

For the sake of clearness in description, I direct attention to the accompanying drawings, in which—

Figure 1 is a view in elevation of the assembled parts of the bolt, at the time welding of strap and filler is to begin. In this figure the welding dies (which are also swaging dies, to a degree not practiced in the earlier manufacture) are shown in section. Figs. 2 and 3 are views in cross section of the assembled blank ready for welding and swaging, the planes of section being indicated by the lines II—II and III—III, respectively, in Fig. 1. Fig. 4 is a view similar to Fig. 1, showing the dies closed upon the blank (as they are not in Fig. 1) and showing the bolt at a time when the welding and swaging operation is partially completed. Fig. 5 is a like view, showing the bolt as the welding and swaging operation is just completed. Fig. 6 illustrates the further working of the already welded shank member to bring it to ultimate size and finished condition. Fig. 7 is a view in elevation of the completed bolt.

Corresponding numbers are used to designate the same parts in the several figures.

In the practice of my invention, I provide a filler which, instead of being of uniform thickness throughout, as in the practice which has heretofore been followed, is tapered, enlarging outwardly from the end which in the finished article is the link end of the shank. Upon the diverging surfaces of this tapered filler which surfaces are indicated by the dotted line 9 in Fig. 1, the ends of the strap are brought to engagement.

In Figs. 1 to 3, the filler is indicated at 1, the strap at 2, and the head at 3; it will be observed that the strap 2 is looped through the link with which the head 3 is provided, and that its otherwise free ends engage diverging surfaces on opposite sides of the tapered filler 1. The smaller end of the tapered filler is, for best practice, of approximately its ultimate size; for it is desirable at this point, in order not to start any opening of the weld, to have a minimum amount of forging consistent with perfect condition of metal in the weld. In looping and bending the strap to assembled position upon the filler, the loop will preferably be flattened or narrowed by compression between dies, and incidentally the body of the rod which forms the strap will at the point where strap and filler meet at the inner end of the shank be flattened from circular to elliptical shape, as is indicated in Fig. 2. In other words, instead of bending the strap over by exerting bending stress near its ends and allowing the substance of the metal near the bend to assume a natural curve around the looped portion of the head 1, a crushing stress is exerted upon the loop of the filler when formed.

As is particularly illustrated in Figs. 2 and 3, the diverging surfaces of the filler are preferably provided with grooves shaped and proportioned to receive the strap and afford the best disposition of metal for welding and shaping to shank form. It will further be observed in Fig. 1 that the engaging surfaces between strap and filler are not only relatively diverging, but they are curved, to progressively increase the degree of divergence outwardly from the inner or link end. This is a preferred structural detail.

It is by virtue of the fact that the filler is tapered, that I am able to bring the whole of the filler and the applied portions of the strap to substantially uniform welding temperature at one time, without such care and manipulation as has made the practice of manufacture heretofore relatively difficult and expensive, and such as I have described above. A greater amount of heat is required at the larger end than at the smaller to bring the whole uniformly to welding temperature. But the smaller end of the tongs, which hold the article while being heated, carries away a quantity of heat for which the excessive size of the free end makes compensation.

It is due to the preliminary flattening of the loop between dies, which I have mentioned, that in the finished article the sides of the loop, that is the portions of the link immediately adjacent the inner end of the weld, extend in a direction substantially identical with the lines of strain in service; consequently, the tendency to elongation of the loop in service is overcome.

My invention further consists in a welding and swaging operation in which the stress is concentrated and localized at a relatively small portion of the length of the shank, and progresses from the interlinked end of the shank member, which is being formed toward the free end. This operation, so characterized, is effected between dies 5 and 6 whose acting surfaces are preferably of small extent, in relation to the ultimate length of the shank to be formed, and the dies are recessed at either side of these acting surfaces, to accommodate the head member of the bolt, and the unworked portion of the blank, and at the same time permit of the concentration of stress upon the portion of the blank which is being worked.

The progress of the welding and swaging operation will be understood on comparing Figs. 1, 4, 5, and 7. It will however be understood by those skilled in the art that while visually in Fig. 4 the closed dies engage the surfaces of the head and of the unworked portion of the filler blank, the proportions are in fact such as to concentrate the working strain in the intermediate portions of the die faces. It will be observed of the operation thus indicated, in consequence of the tapered form of the filler, and the localization and progression of the effective strain, that welding is effected with comparatively little swaging at the forward or interlinked end of the shank. Accordingly, the weld will be insured there, where greatest insurance is required. It will be observed further, in consequence of the tapered form of the filler, that opportunity is afforded as welding progresses, to work out along the inclined surfaces particles or patches of slag which otherwise, entrapped between the united bodies, would (to the extent that they may be present) interrupt union between the said surfaces. The curved configuration of the engaging surfaces, indicated in Fig. 1, I find best suited to that end.

The further operation, indicated in Fig. 130

6, will readily be understood; it is the simple and familiar one of finishing the shank, and involves a further relatively slight swaging or reduction of the shank in diameter. As shown in the figure, the portion of the shank at the inner and linked end is already reduced, and the portion at the outer free end has not yet been acted on; the finishing dies 7 and 8 engage the intermediate portion. When the stay-bolt has otherwise been completed, in the manner already described, the opposite ends are provided with screw threads, as indicated in Fig. 7, and the bolt is then ready for use.

I claim herein as my invention:

1. As an improvement in the art of forming stay-bolts with interlinked head and shank, the method herein described, which consists in looping a strap through a link-formed head member, and simultaneously welding the ends of said strap upon a filler formed with tapered strap-engaging surfaces and reducing said strap ends and filler together to form a shank member.

2. As a step in the operation of forming stay-bolts with interlinked head and shank, the method herein described which consists in looping a strap and bringing its free ends into engagement with and upon opposite surfaces of a filler formed with tapered strap-engaging surfaces, heating the parts when so assembled, and progressively welding and swaging the assembled and heated blank from its smaller to its larger end.

3. The method herein described of forming the shank members of stay-bolts with interlinked head and shank, which consists in looping a strap and bringing its free ends into engagement with and upon opposite and outwardly inclined surfaces of a filler and progressively welding the parts so united by a welding stress applied in a direction angular to said surfaces of engagement.

4. As a step in the operation of forming stay-bolts with interlinked head and shank, the method herein described, which consists in looping a strap, crushing or contracting the loop so formed, and simultaneously welding the ends of said strap upon a filler having outwardly inclined strap-engaging surfaces and reducing said strap ends and filler together to form a shank member.

5. As a step in the operation of forming stay-bolts with interlinked head and shank, the method herein described, which consists in looping a strap and bringing its free ends into engagement with and upon opposite tapered and curved surfaces of a filler, heating the parts when so assembled, and progressively welding and swaging the assembled and heated blank, in the direction of the divergence of the said engaging surfaces.

In testimony whereof I have hereunto set my hand.

JAMES H. BAKER.

Witnesses:
ALICE A. TRILL,
FRANCIS J. TOMASSON.

---

Copies of this patent may be obtained for five cents each, by addressing the "Commissioner of Patents, Washington, D. C."